May 25, 1926.

E. L. A. SAVY 1,586,386

CONFECTION COATING APPARATUS

Filed March 20, 1925   5 Sheets-Sheet 1

Fig. 1.

INVENTOR.
Emile L. A. Savy
BY Chapin & Neal
ATTORNEYS.

May 25, 1926.

E. L. A. SAVY 1,586,386

CONFECTION COATING APPARATUS

Filed March 20, 1925      5 Sheets-Sheet 4

Fig. 4.

INVENTOR.
Emile L. A. Savy
BY Chapin + Neal
ATTORNEYS.

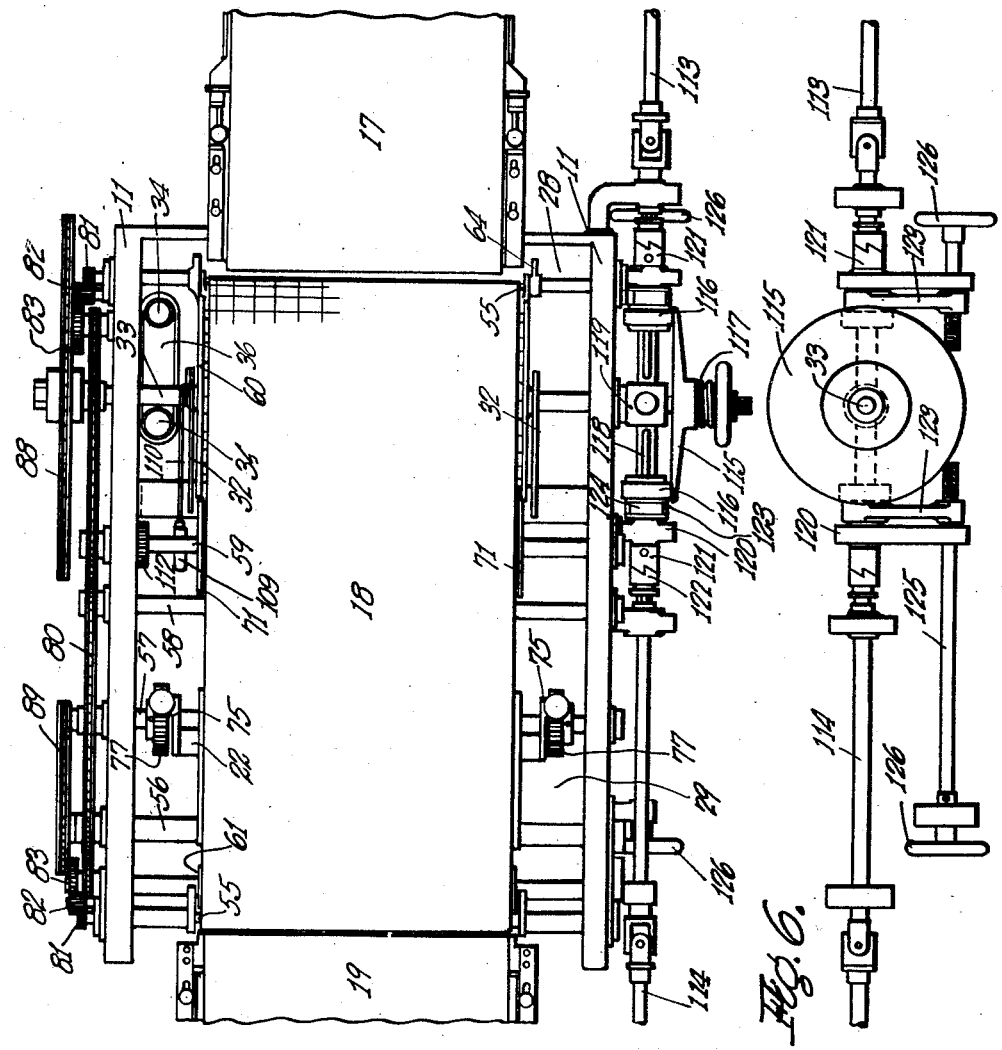

Patented May 25, 1926.

1,586,386

UNITED STATES PATENT OFFICE.

EMILE LOUIS ALFRED SAVY, OF COURBEVOIE, FRANCE.

CONFECTION-COATING APPARATUS.

Application filed March 20, 1925. Serial No. 17,060.

This invention relates to the coating of confections, as effected automatically in a confection coating machine. More particularly, it relates to a method of treating the chocolate coating during its travel through the machine and to an apparatus for practicing the method.

The invention is adapted primarily to that type of coating machine in which the chocolate is flooded over the articles while carried by a pervious support and in which the excess chocolate, not used for coating, passes through said support and is collected and elevated to a point where it can be subsequently delivered upon the articles. In machines of this type, the chocolate supply tank, in which the coating is kept thoroughly mixed and at the desired temperature, is located below the pervious confection support and coating therefrom is elevated and delivered to a shower pan located above said support. From this pan a stream of coating issues and falls by gravity to envelop the confections on the pervious support, which is usually a travelling wire mesh conveyer. The excess coating, passing through the latter, falls directly into the supply tank.

A disadvantage of this prior practice is that the conditioned coating in the supply tank has to travel through a considerable distance before being applied to the goods and there is a considerable time interval during which the chocolate may lose some of the effects of the conditioning operation. For example, it may not retain precisely the correct temperature and be of the proper consistency. Moreover, the chocolate, which is a mixture of finely divided solids with a cocoa butter content which is readily liquefiable, may separate to some degree into its respective constituents and lose its homogeneous nature. Particularly, the cocoa butter will readily separate from the other constituents and it is most important not to have this occur as it means a loss of the brilliant gloss and lustre in the coatings of the confections.

This invention has for a principal object the provision of a confection coating apparatus designed for applying the chocolate to the confections as directly and as quickly as possible and for this purpose the chocolate supply tank is located above the pervious confection support, rather than below it, as in prior practice. The conditioned coating can accordingly be delivered directly and quickly upon the articles, as by gravity flow, from the tank, and consequently the confections will be coated with chocolate having the desired characteristics. The chocolate, not used for coating the articles, passes through the confection support and is collected and elevated to the supply tank for reconditioning.

The invention also provides means for treating that portion of the chocolate which passes through the pervious confection support with the end in view of preventing, as far as possible, a separation of the cocoa butter content of the chocolate mixture during its travel back to the supply tank. Such separation is prevented in the tank by continual mixing but while the chocolate is out of the tank and traversing its path back to the latter the separation is liable to occur.

More particularly, I avoid separation of the cocoa butter during the described time by chilling the chocolate mixture to an extent sufficient to prevent the cocoa butter from separating. That is, the chocolate falling through the pervious conveyer is lowered in temperature until it will just barely continue to flow. While the chocolate is still fluid, it is thicker in consistency and somewhat sluggish in flow. The cocoa butter is probably solidified and therefore cannot separate from the other constituents.

Another feature of the invention results from the fact that the chocolate has imparted thereto, during its cycle of travel through the machine, two different temperatures one of which is above the normal melting point and the other slightly below such point, whereby I am enabled to utilize what I call the phenomenon of surfusion which results in improved gloss and lustre in the applied coatings. Whatever the theory may be, I have found that this result is obtained when a body of chocolate is chilled a few degrees below its normal coating temperature and subsequently mixed with a body of warmer chocolate at or around said normal temperature.

The invention has for another object the provision of improved heating arrangements for a confection coating machine, characterized among other things in the heat control of the machine adjacent the exit opening thereof, whereby to prevent the premature chilling and consequent wiremarking of the freshly coated confections.

Other objects and advantages will appear in the following description and in the illustrative embodiment of the invention in the accompanying drawings, in which:—

Fig. 1 is a sectional elevational view of a machine embodying my invention;

Fig. 4 is a rear elevational view of the machine;

Fig. 5 is a sectional plan view taken on the line 5—5 of Fig. 1; and

Fig. 6 is a fragmentary elevational view illustrative of the speed controlling devices for the feed and delivery belts.

Figure 2:
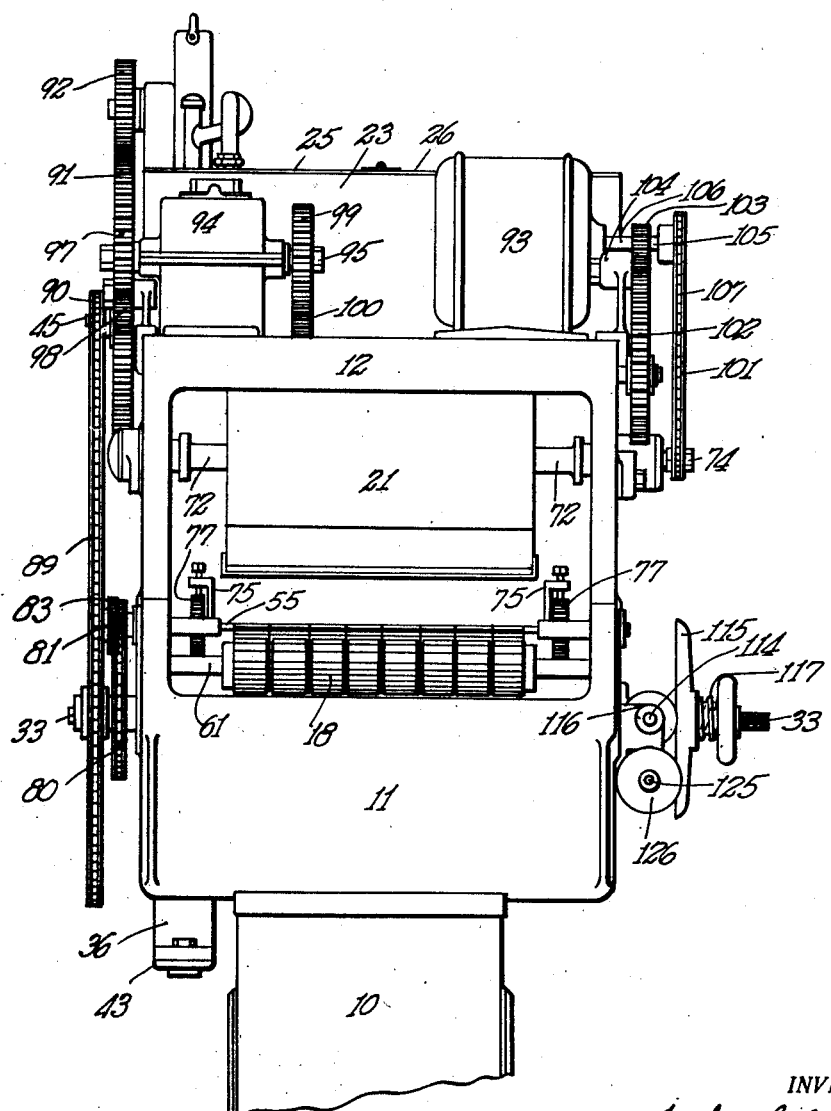
Fig. 2 is an end elevational view taken from the left hand side of Fig. 1.

Referring to these drawings and particularly to Fig. 1; the frame of the machine includes three main parts,—a hollow supporting pedestal 10, a hollow casting 11 which rests upon the top of the pedestal and is open at its upper end, and a casing 12 which is superposed on the casting 11 and supported by resting on the side walls thereof. The ends of casing 12, which are open, are provided with guideways 13 to slidably receive windows 14, whereby said ends may be closed in a manner to render the interior of the machine conveniently accessible when desired. The casing 12 does not overlie the entire upper end of casting 11 and a horizontally disposed window 15 is removably supported from the side walls of casting 11 to cooperate with casing 12 in providing a complete enclosure, except for small openings at each end to permit the entrance of articles to be coated and the discharge of coated articles.

The articles to be coated are supplied to the machine in the usual manner by a feed belt 17 and are received on a pervious conveyer 18, usually of wire mesh construction and commonly referred to as a wire belt. Conveyer 18 carries the articles during the coating, and other operations, and finally transfers them to a delivery belt 19, of any suitable type, which carries the coated articles to suitable cooling means. The wire belt 18 is mounted entirely in casting 11 and, in its upper stretch, travels horizontally therethrough near the upper part thereof. Above the upper stretch of conveyer 18 and suitably supported in casing 12 is a shower pan 20 arranged to deliver one or more streams of chocolate upon the articles carried by wire belt 18. Mounted in casing 12 and located beyond the shower pan in the direction of travel of belt 18 is a fan 21 from which a blast of air is delivered upon the freshly coated candies to remove superfluous coating. Beyond the fan and underlying the belt 18 is a rapping frame 22 by which the belt, and the coated articles carried thereby, is vibrated in the usual manner for the purpose of smoothing out any wrinkles in the coating which may have been caused by the action of fan 21. The coating is thus applied to the articles in a common and well known manner.

A distinctive feature of the machine consists in the location of the main chocolate supply tank, in which the coating is conditioned and mixed, and the effort has been to so locate this tank that the conditioned coating may be delivered therefrom as directly as possible and as quickly as possible upon the articles to be coated. In pursuance of this end, the supply tank, shown at 23, has been located above the wire belt, rather than below the same as in former types of coating machines, and its outlet 24 is disposed immediately above the open upper end of shower pan 20. As shown, tank 23 is formed as an integral part of casing 12 and its upper end is open and accessible from outside the machine. A suitable cover 25, including a movable section 26 hinged thereto (Fig. 3), is provided to close the open end of the tank in normal operation and yet permit convenient access thereto when required. Tank 23 is provided with a jacket 27 in which a suitable temperature controlling medium is circulated to warm the chocolate. In actual practice, the heating medium is regulated by suitable means so that the temperature of the chocolate is maintained practically constant at a predetermined temperature.

As in prior machines, all excess chocolate not used for coating the articles passes through the wire belt 18 but unlike prior machines it does not pass directly into the main supply tank. The casting 11 has been constructed as a trough to receive such excess coating and direct it to a common point from which it may be returned to the main supply tank. Thus, the casting 11 is formed to provide a relatively deep and approximately semi-circular sump 28, which is located below the shower pan 20 and receives the excess coating, the major portion of which passes through wire belt 18 at this point. Connected with sump 28 and underlying the remaining portions of wire belt 18 is an inclined floor 29 which slopes downwardly from the delivery end of the machine toward the sump. The drippings from the coated articles are carried along this floor to the sump and this result is facilitated by arranging the return stretch of the wire belt 18 so that it rubs lightly over the floor. As a consequence, the cross wires of the belt scrape back the drippings and insure that they are carried to the sump.

The excess chocolate, while carried along floor 29 and while in sump 28, is subjected to a conditioning operation. The casing 12, in those portions which underlie floor 29 and encompass the lower semi-circular sump, is provided with a jacket 30 in which a temperature controlling medium is circulated. As above described, this medium is in practice regulated so as to keep the temperature of the chocolate in sump 28 substantially constant at a predetermined temperature but the temperature chosen is a lower one than that which prevails in the supply tank 23. One purpose in lowering the temperature of the chocolate is to avoid the separation of the cocoa butter content. As to such chocolate as lodges on floor 29, the result is quickly obtained because the chocolate is spread out in a thin sheet over the jacketed floor and rapidly acquires the desired temperature. To assist in obtaining the desired result in the sump 28 it is desirable to agitate the chocolate and keep it thoroughly mixed. The agitation also insures that all parts of the body of chocolate in the sump will be brought against the jacketed walls and that this body will be cooled to as uniform a degree as possible. The agitation is effected by transversely-disposed agitator blades 31 which move back and forth over the curved floor of the sump and are carried by and between spaced side members 32 which are mounted to oscillate freely on a shaft 33.

Figure 3:
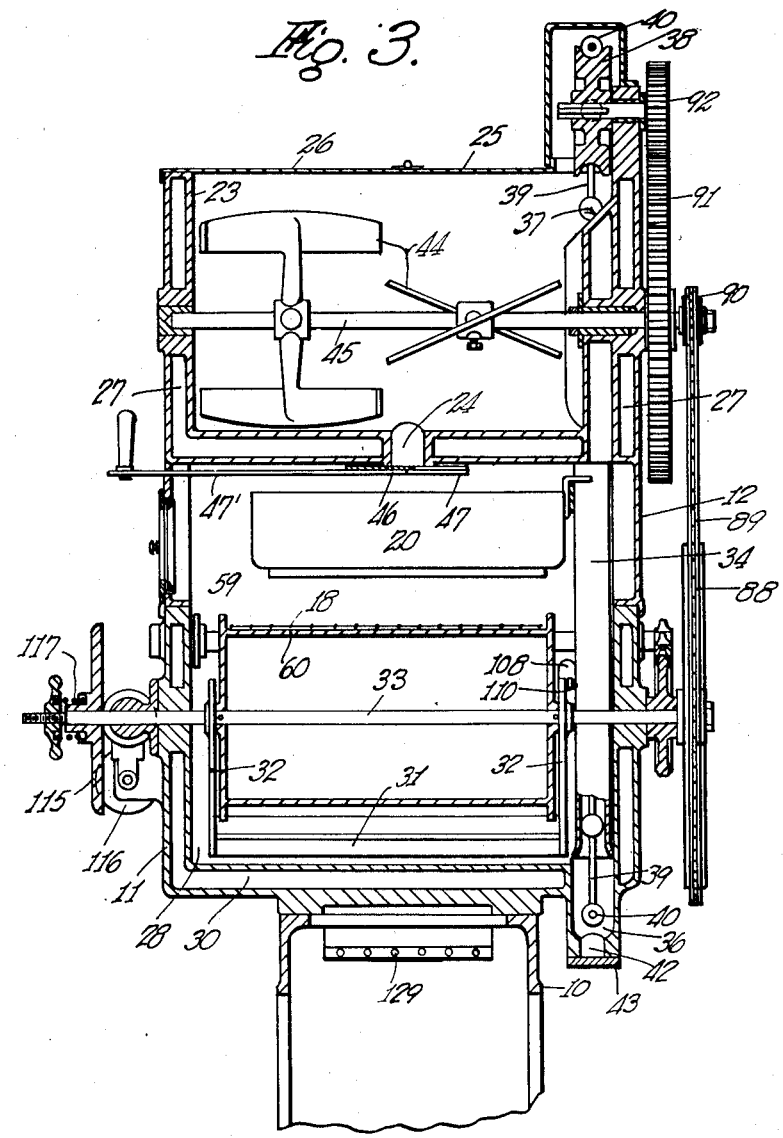
Fig. 3 is a cross sectional view taken on the line 3—3 of Fig. 1.

For the purpose of returning the chocolate from sump 28 to the supply tank 23 any suitable elevating means may be employed. As an illustrative example of one such means, the following mechanism may be used. Two parallel tubes 34 are fixed in vertical openings 35 formed in one end wall of tank 23 and extend downwardly into sump 28 at one side thereof and above a pocket 36 which constitutes the lowest part of the sump and into which all the excess chocolate is eventually directed. The upper ends of tubes 34 communicate with tank 23 near its upper end, opening into the latter through an inclined ledge 37 (Fig. 3). Above and at one end of the reservoir is a pulley 38 and trained over the latter is an endless cable 39 which extends into the pocket 36. At intervals on this cable are balls 40, which loosely fit within the tubes. These balls ascend through the left hand tube shown in Fig. 1 entering readily through the lower bell-mouthed end of the same (Fig. 3), and descend through the right hand tube shown in Fig. 1, the upper end of which extends somewhat above ledge 37, and is cut off at an angle, as at 41, to function as a scraper to remove chocolate adhering to the balls. Since the latter fit loosely in their tubes, the chocolate will drain back into the sump when the machine is stopped. The pocket 36 is provided with an outlet 42, normally closed by a valve 43 which can be manually opened to drain the sump and pocket when required.

The supply tank 23 is provided with rotatable stirring paddles 44, which are fixed to a horizontal shaft 45, mounted at its ends in the end walls of the tank and extending through and beyond one of such walls for connection to the driving mechanism. These paddles keep the chocolate thoroughly mixed at all times and cause it to circulate so that all parts are brought in proximity to the temperature conditioning walls. Thus, the chocolate is kept very closely at the desired predetermined temperature and a homogeneous mixture is maintained.

The chocolate, thus conditioned in tank 23 is delivered through outlet 24 into the shower pan 20 by gravity, the outlet 24 being regulable by a gate valve 46 slidably mounted in gibs 47 and capable of being operated from outside the machine by pushing or pulling on a rod 47' (Fig. 3). The valve can be operated to permit a continuous flow from tank 23 to the shower pan, which flow can be regulated according to demands, or the valve may be intermittently opened and closed to periodically replenish the shower pan. In normal use, the valve is adjusted to permit a continuous flow of chocolate. By the shower pan 20, the chocolate is distributed into a broad transverse stream which immediately descends upon the articles to be coated. The interval between the time when the chocolate emerges from the conditioning tank and the time when it is applied to the goods is exceedingly short. The result is that the chocolate does not have time to change materially in temperature nor do the constituents of the mixture have opportunity to separate,—the cocoa butter content being kept mixed with the other constituents of the mixture practically up to the point of application of the mixture to the articles to be coated. Since the cocoa butter content is so effectively utilized a smaller percentage of this expensive element can be used in the mixture and the same results, as to glossy coatings obtained as with a larger percentage used in the less effective manners heretofore prevalent.

The shower pan 20 is provided with two outlet slots 48 in its bottom and a separate valve bar 49 is provided for each, such bars being connected to a common operating rod 50, whereby they may be simultaneously slid back and forth along the lower face of the shower pan. The arrangement is such that either slot 48 may be entirely closed off so that a single stream of chocolate may be obtained from either, or both slots may be fully open to give two full streams, or the two outlets may be partially closed off, while working in conjunction. In addition to these slots, there is a third outlet 51, at the forward lower corner of the shower pan.

which outlet is more in the form of a nozzle. One wall 52 of outlet 51 is pivoted at 53 to the shower pan and may be held in various positions of adjustment by a suitable fastening device such as 54. This nozzle may be entirely closed or opened to various degrees to form sheets of chocolate of various thicknesses. The chocolate therefore may be applied at any one, or more, or all of these three locations.

The wire belt 18, heretofore referred to, is trained over two very small rolls 55, one at each end of its upper stretch of travel. Intermediate these rolls are other rolls 56, 57, 58, 59 and 60, all of which serve to support the belt in its upper stretch of travel. The roll 60 is a relatively large roll centrally disposed with respect to sump 28 and is fixed to the shaft 33, above described. This roll is provided with end flanges which serve to confine belt 18 against sidewise movement. The belt is driven by a roll 61, adjacent the delivery end thereof, and from this roll the belt travels over the floor 29, as above described, to a roll 62 from whence it passes around the bottom of roll 60 and back to that end roll 55, which is located at the receiving end of the machine. The usual tension roll 63 is provided which is carried by and between the depending arms of a pair of bell crank levers 64 pivotally mounted on the bearing hubs of the adjacent roll 55. The horizontal arm of each lever 64 is connected to a rod 65 which is slidable in a guide 66 and carries a collar 67. A spring 68 acts between guide 66 and collar 67 to force roll 63 against belt 18. The rolls 56, 57 and 58 are provided with the conventional scrapers 69 which serve to clean the same of chocolate,—the chocolate falling to floor 29 and being carried as above described to sump 28.

Between the rolls 59 and 60, and underlying belt 18 in closely adjacent relation thereto, is a thin plate 70 which extends across the machine and is secured at its ends to casting 11. Plate 70 has upstanding flanges 71, one adjacent each side of the belt, and is adapted to receive chocolate falling through the belt from the shower pan and maintain a layer of chocolate for bottom coating the articles. The roll 60 also receives chocolate from the shower pan and functions as a bottoming roll to coat the bottoms of the confections.

The fan 21 has trunnions 72 at each end thereof which are mounted in bearings in the side walls of casting 12. The rotor 73 of the fan is mounted on a shaft 74 which is rotatably mounted inside the trunnions and projects through and beyond one thereof for connection to the driving means.

The rapping frame 22 is of conventional form, pivotally supported at one end from roll 56 and having upstanding arms 75, one at each side thereof, provided with adjustable pawls 76 which rest on ratchet wheels 77, fixed to roll 57.

The various rolls associated with wire belt 18 are mounted in the side walls of casting 11 and extend beyond one of said side walls, as shown in Fig. 4. Sprockets are provided on the projecting ends of rolls 56, 57, 58, 59, 60 and 61 and idler sprockets 78 and 79 are mounted on said side wall. A chain 80 is trained over these sprockets in the manner shown in Fig. 4 to interconnect all the rolls so that they turn in the same direction. Each end roll 55 has a pinion 81 fixed thereon which is driven through an idler pinion 82 from a gear 83 fixed to an adjacent sprocket (in one case the sprocket 78 and in the other the sprocket on roll 61). The sprocket 84 is loose on roll 57 but adjacent thereto is a sprocket 85 which is fixed to said roll and driven at higher speed by a chain 86 from a larger sprocket 87 on the adjacent roll 56. On the shaft 33 is a large sprocket 88 driven by a chain 89 from a sprocket 90 fixed to the outwardly projecting end of shaft 45 which drives the stirring paddles 44. Also fixed to shaft 45 is a gear 91 which drives a gear 92 fixed to the shaft of the pulley 38,—above described as driving the chocolate elevator.

The driving mechanism, as illustrated, consists of an electric motor 93 and a change speed transmission represented conventionally at 94 and having a driving shaft 95 and a driven shaft 96. The latter carries a gear 97 which drives an idler gear 98 meshing with the gear 91 above described. The driving shaft 95 carries a gear 99 which through an idler gear 100 drives a gear 100' on one end of a shaft 101, which extends across inside casing 12 and through the latter. On the other end of shaft 101 is a gear 102, which meshes with an idler gear 103, rotatably supported by a bracket 104, and the gear 103 is driven by a pinion 105 on the armature shaft 106 of motor 93.

The fan rotor is driven by a chain 107 and suitable sprockets which directly connect its shaft 74 with the armature shaft 106 (Fig. 2).

The agitator blades 31, which as above described are carried by side frames 32 pivotally mounted on shaft 33, are driven by an eccentric 108, the strap 109 of which is connected to a rod 110 pivotally connected to one of the side frames 32. The eccentric 108 is mounted on a stud 110 secured to one of the sides of casting 11 and fixed thereto is a gear 111 which is driven by a gear 112 from the roll 59, above described.

The feed belt 17 and delivery belt 18 are of usual form and require no illustration and description herein. Their drive shafts are shown at 113 and 114, respectively, in Fig. 5 and provision is made for driving them from the shaft 33, above described. On the latter is a friction wheel 115 yieldingly forced inwardly against two smaller friction wheels 116 by a spring 117. Each wheel 116 is slidably keyed to a short shaft 118. Each shaft 118 is supported at one end in a common central bearing 119 and at the other end extends through a bearing 120 and, beyond the bearing, it has pinned thereto a clutch element 121. The shaft 113 or 114, as the case may be, terminates adjacent the end of its shaft 118 and has slidably keyed thereto a clutch element 122 adapted to be engaged or disengaged with the element 121, whereby the feed and delivery belts or either of them may be stopped without stopping the rest of the machine. The speed of either belt may be regulated by shifting its friction wheel 116 relatively to the large friction wheel 115. This may be effected in each case by a shifter arm 123 engaging at its upper end a clutch collar 124 carried by the friction wheel 116. The other end of arm 123 is threaded on a shaft 125 which is rotatable by a hand wheel 126. The hand wheels 126 are located one near each end of the machine.

The casing of the machine is, as usual, heated and in Fig. 1 an electric heating element 127 is shown for this purpose. The casing is also placed in communication with the air space of tank 23 by two cord passages 128 which extend vertically upward through one end wall of tank 23 in parallel relation with tubes 34 and open into the tank through the inclined ledge 37. In the hollow pedestal 10 is an electric heating element 129 and air, entering this pedestal, may travel through a passage 130 into the casing through its delivery end. This passage is formed by a sheet metal enclosure 131 encompassing the lower face of casting 11 adjacent one side of sump 28 and adjacent the inclined floor 29. A pivoted section 132 of the enclosure may be swung downwardly to disconnect the air passage 130 from the casing when desired. The provision of passage 130 through which air heated by element 129 may be induced to enter the casing, is desirable for several reasons. First, it aids in maintaining the desired air temperature at the delivery end of the machine and prevents that premature chilling of the coated candies which results in wire marked bottom coatings. Second, it aids materially in rapidly warming up the entire machine from a cold condition. The fan 21 acts to induce a flow of heated air through passage 130 and to circulate this air through and into all parts of the casing and even into the chocolate supply tank 23. The heater 129 may be used to supplement the action of heater 127 for quickly thawing out the machine. Its action may subsequently be stopped either by disconnecting it from its electrical supply circuit or by turning down the pivoted section 132. Normally the heater 129 will not be required but under certain conditions it can be used to advantage during normal operation of the machine, particularly if the coated articles tend to become wire marked.

The coating operation is largely the same as is ordinarily practiced and will sufficiently appear from the foregoing description. During the cycle of travel of the coating, however, there is the novel feature that the coating takes successively two different temperatures and these temperatures are so chosen as to effect the phenomenon of surfusion by means of which a high brilliancy is imparted to the coated articles. It has been found that if the temperature of the coating is lowered somewhat below its point of fusion and subsequently raised to or slightly above such point, that this phenomenon occurs. The chocolate mixtures used in practice vary considerably and the two temperatures just mentioned will necessarily vary with them. As an example, however, the temperature of the chocolate in the sump may be kept at 28° C., and that in the tank 23 at 34° C. The chocolate at the higher temperature, maintained thoroughly mixed in tank 23 to prevent separation of the cocoa butter content and in a very fluid state, is applied almost directly after its conditioning to the articles to be coated. Consequently, the coating is applied under the best conditions and high grade work results. The excess chocolate falling for the most part directly into sump 28 but to some extent onto the floor 29, is immediately lowered in temperature so that it will just barely flow. By so doing the cocoa butter content is congealed or at least cooled sufficiently to prevent it from separating from the mixture. Also it is given the lower temperature necessary to effect the surfusion phenomenon. The chocolate, maintained at this lower temperature, is carried back to tank 23 in relatively small volumes in comparison with the volume of the tank and mixed with the warmer chocolate therein. This mixing of a small volume of chilled chocolate with a larger volume of warmer chocolate results in an improved brilliancy and lustre in the coating when applied to the articles,—a phenomenon which I call surfusion. Whatever the theory may be, I have found that the result takes place by chilling part of the chocolate and subsequently mixing it with warmer chocolate just before it is applied to the articles to be coated.

The invention has been disclosed herein, in an embodiment at present preferred, for illustrative purposes but the scope of the invention is defined by the appended claims rather than by the foregoing description.

What I claim is:

1. In a confection coating machine, a pervious conveyer to carry the articles to be coated, a main supply tank located above said conveyer and adapted to receive the main body of coating material and in which such body remains long enough to be conditioned for the coating operation, heating means for said tank, stirring means in said tank effective on the relatively large body of coating therein to perform in conjunction with said heating means the major conditioning operation on said coating, a shower pan into which the conditioned coating flows directly from said tank, and means for collecting the coating passing through said conveyer and returning it to said tank.

2. In a confection coating machine, a casing, a pervious conveyer adapted to carry the articles to be coated therethrough, a supply tank for the coating material mounted in the casing above said conveyer and having an outlet in the lower part thereof, a heating jacket provided for said tank, agitating means therein, said heating and agitating means adapted to perform the major coating conditioning operation of the machine, means also mounted in the casing and above said belt and adapted to receive the conditioned coating from said tank through said outlet and distribute it upon the articles to be coated, and means to collect such coating as passes through said conveyer and return it into the upper part of said tank.

3. In a confection coating machine, a casing provided with a sump and an inclined floor leading thereto, a pervious conveyer for the articles to be coated mounted to travel above said floor and sump in its confection carrying stretch and in its return stretch to rub along said inclined floor, and means above the conveyer for applying coating to the articles carried thereby, the coating passing through said conveyer upon said floor being scraped therefrom and assisted in its travel to said sump by the rubbing of the return stretch of said conveyer along said floor.

EMILE LOUIS ALFRED SAVY.